(No Model.)  3 Sheets—Sheet 1.

G. H. WEBB & J. CLARE.
MACHINE FOR THREADING NUTS.

No. 570,193.  Patented Oct. 27, 1896.

Witnesses  
A. L. Whiting  
M. J. Galvin

Inventors  
George H. Webb  
James Clare  
By their Attorney  
John C. Dewey

THE NORRIS PETERS CO., PHOTO-LITHO., WASHINGTON, D. C.

(No Model.) 3 Sheets—Sheet 2.

G. H. WEBB & J. CLARE.
MACHINE FOR THREADING NUTS.

No. 570,193. Patented Oct. 27, 1896.

Witnesses
A. L. Whiting
M. J. Galvin

Inventors
George H. Webb.
James Clare.

By their Attorney
John L. Dewey (No Model.) 3 Sheets—Sheet 3.
G. H. WEBB & J. CLARE.
MACHINE FOR THREADING NUTS.

No. 570,193. Patented Oct. 27, 1896.

Witnesses
Inventors
George H. Webb.
James Clare.
By their Attorney
J. C. Dewey

UNITED STATES PATENT OFFICE.

GEORGE H. WEBB AND JAMES CLARE, OF PAWTUCKET, RHODE ISLAND; SAID CLARE ASSIGNOR TO SAID WEBB.

MACHINE FOR THREADING NUTS.

SPECIFICATION forming part of Letters Patent No. 570,193, dated October 27, 1896.

Application filed May 28, 1896. Serial No. 593,397. (No model.)

*To all whom it may concern:*

Be it known that we, GEORGE H. WEBB and JAMES CLARE, citizens of the United States, residing at Pawtucket, in the county of Providence and State of Rhode Island, have invented certain new and useful Improvements in Machines for Threading Nuts, &c., of which the following is a specification.

Our invention relates to machines for threading nuts, &c.; and the object of our invention is to provide an improved machine in which the nuts are automatically fed to the tap or tool which cuts the thread in the nut and are strung on the tap until it is filled with threaded nuts. The carriage carrying the plunger which forces the nuts against the tap is then moved back to make room for drawing out the tap and dropping off the threaded nuts preparatory to again filling the tap with threaded nuts.

Our invention consists in certain novel features of construction of our machine for threading nuts, &c., as will be hereinafter fully described.

Figure 1:
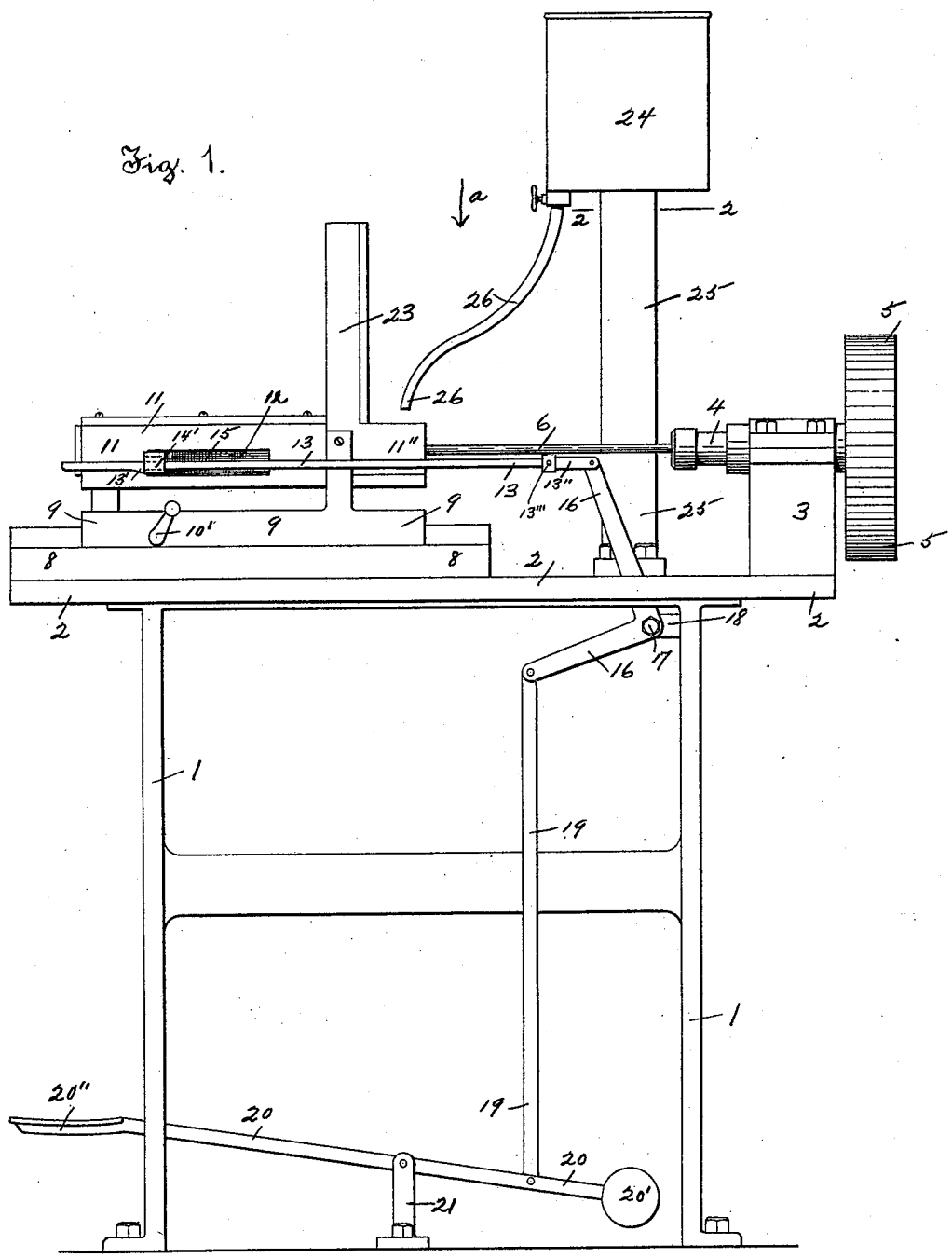
Figure 2:
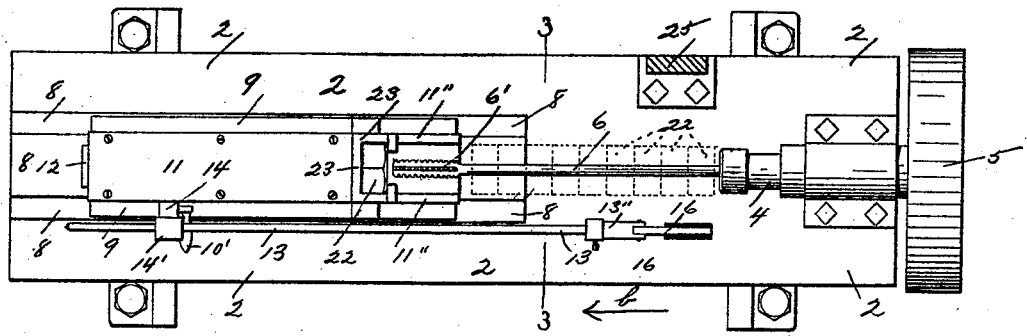
Figures 3, 4:
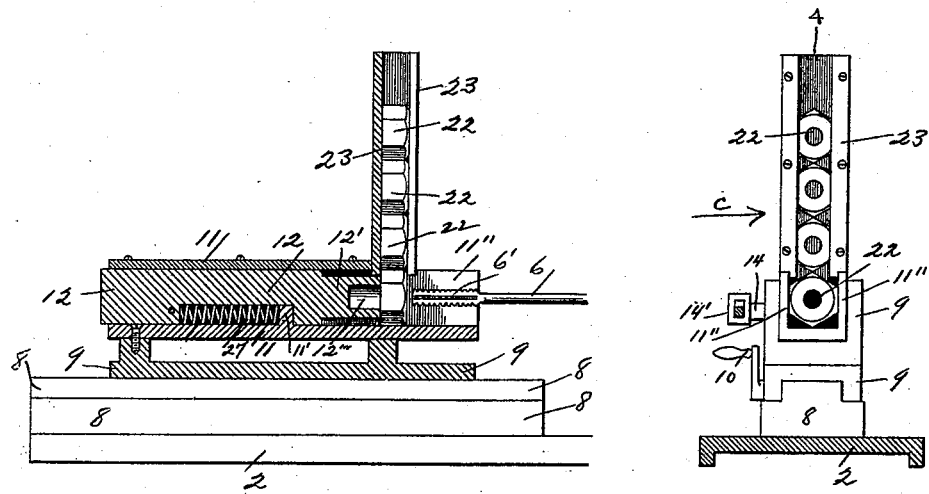
Figure 5:
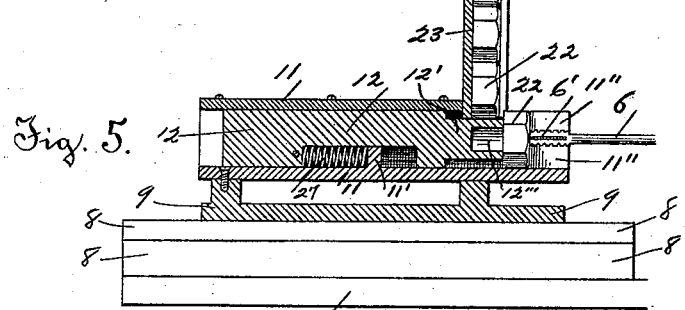
Figure 6:
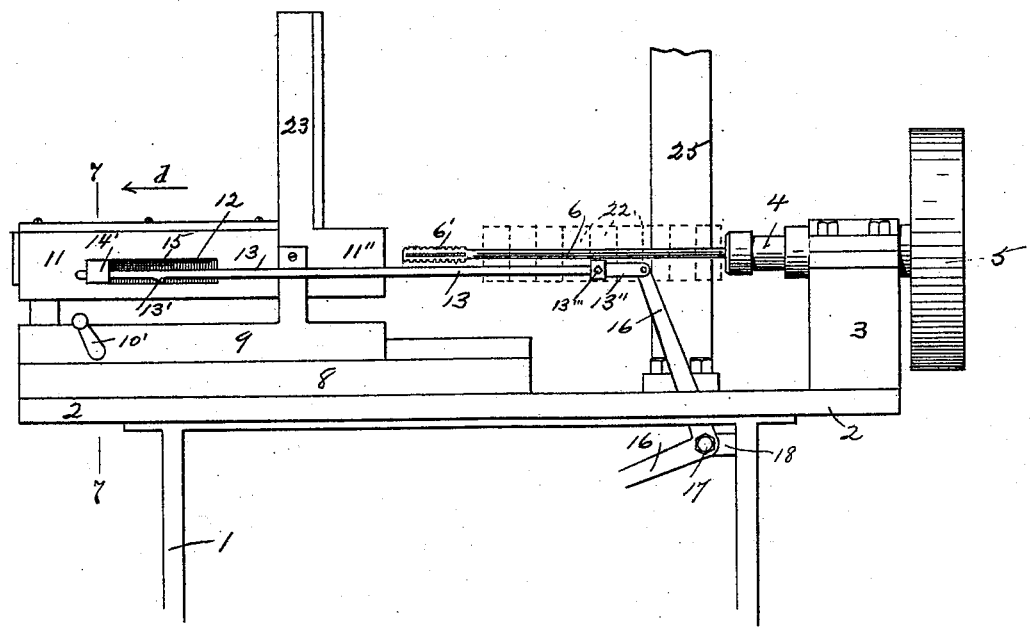
Figure 7:
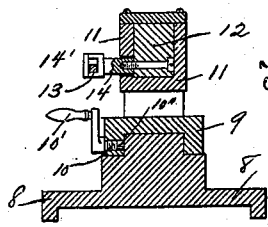

Referring to the drawings, Figure 1 is a side view of a machine embodying our improvements. Fig. 2 is a plan view taken at a point indicated by line 2 2, Fig. 1, looking in the direction of arrow $a$, same figure. The spout leading from the oil-holder is not shown. Fig. 3 is a cross-section on line 3 3, Fig. 2, looking in the direction of arrow $b$, same figure. The tap is not shown. Fig. 4 is a vertical section on line 4, Fig. 3, looking in the direction of arrow $c$, same figure. The track and bed are not shown in full lines. Fig. 5 corresponds to Fig. 4, but shows the plunger in its forward position after the nut has been threaded. Fig. 6 corresponds to Figs. 1 and 2, but shows the plunger-slide drawn back preparatory to removing the tap filled with threaded nuts; and Fig. 7 is a vertical cross-section on line 7 7, Fig. 6, looking in the direction of arrow $d$, same figure.

In the accompanying drawings, 1 is the frame of the machine, on the top of which the bed 2 is supported. At one end of the bed 2 is a stand 3, in the upper end of which is journaled the shaft 4, carrying a driving-pulley 5, fast on one end thereof, and in the other end of the shaft 4 one end of the tap 6 is held. The opposite end of the tap 6 is provided with a screw-thread 6' thereon, which cuts the thread in the nut.

On the opposite end of the bed 2 from the stand 3 is supported a track 8, on which a slide 9 is adapted to move longitudinally. The slide 9 is secured to the track 8, when desired, to prevent any longitudinal motion of said slide, in this instance by a screw 10, provided with a handle 10', and in a screw-threaded hole in one side of the slide 9 to force a plug 10'' into contact with the edge of the track 8. (See Fig. 7.) The turning out of the screw 10 allows the slide 9 to move longitudinally on the track 8. On the slide 9 is secured, to move with said slide, a plunger-holder 11, within which the plunger or pusher 12 has a reciprocating motion.

Motion is communicated to the plunger 12 to force the nut onto the tap 6 by a rod 13, the free end of which extends loosely through a hole in the head 14' of a stud 14, extending out from one side of the plunger 12 through a slot 15 in one side of the plunger-holder 11. Said free end of the rod 13 is provided with a projection 13', which engages the head 14' and causes it to move to the right with said rod. The opposite end of the rod 13 is adjustable longitudinally by a set-screw 13''' in the rod-head 13'', which is pivotally attached to one arm of an angle-lever 16, pivoted at 17 on an arm 18 on the frame 1. The other arm of the angle-lever 16 is pivotally connected, through a connector or link 19, to the inner end of a foot-lever or treadle 20, pivoted on a stand 21, secured to the floor. The inner end of the treadle 20 is preferably provided with a weight 20' and the outer end with a flattened portion 20'' to be engaged by the foot of the operator. The depression of the treadle 20 at its front end will, through connector 19, angle-lever 16, and rod 13, move forward the plunger 12 to force the nut onto the tap 6.

The front end 12' of the plunger 12 is made round in cross-section, as shown in Fig. 4, to bear against the flat surface of the nuts 22. A spring 27 is located within a recess in the lower part of the plunger 12, and bears at one end against a stationary projection 11' in the plunger-holder 11, and acts to return the plunger 12 after it has been moved forward to force the nut onto the tap 6, as above described.

A reservoir or holder 23 is secured at the front end of the plunger-holder 11, and the nuts are placed in the top of said reservoir and drop down by their own gravity in front of the plunger 12 and between said plunger and the end 6' of the tap 6, as shown in Fig. 4.

The nuts 22 are prevented from turning in the operation of threading by the extended sides 11'' of the plunger-holder 11, which form guides for the nut.

An oil-tank 24 is supported on a stand 25, secured to the bed 2, and has a spout 26, leading out therefrom, which carries the oil and causes it to drop directly onto the threaded end 6' of the tap 6.

From the above description, in connection with the drawings, the operation of our machine for threading nuts, &c., will be readily understood by those skilled in the art.

The position of the slide 9 on the track 8 is properly adjusted, so that the nuts 22 will drop down just in front of the tap 6, as shown in Figs. 2 and 4. The slide 9 is secured to the track 8 by the screw 10, so that there is no longitudinal motion of said slide when the nuts are being threaded.

The reservoir 23 is filled with nuts and the lowest one will drop down directly in front of the plunger 12 and between the front end of the plunger and the threaded end 6' of the tap 6. (See Fig. 4.) The operator now presses on the treadle 20 and, through connector 19, angle-lever 16, and rod 13, moves the plunger 12 forward, as shown in Fig. 5, and forces the nut 22 onto the screw-threaded end 6' of the tap 6. The tap 6 is revolved through shaft 4 and pulley 5. The nut is drawn onto the revolving tap, being held and prevented from turning by the guides or extended sides 11'' of the plunger 11, and the tap cuts the thread in the nut, the end of the tap entering into a hole 12''' in the end of the plunger 12.

The removal of the foot from the treadle 20 allows the spring 27 to act to move back the plunger 12 to its original position, leaving the nut on the screw-threaded end 6' of the tap 6. Another nut will then drop down in front of the plunger, and the forward movement of the plunger, operated by the treadle 20, will force said nut onto the threaded end of the tap to cut the thread therein. The first nut, being held between the guides 11'' and prevented from turning, will be moved along on the threaded end of the tap by the revolution thereof until it reaches the unthreaded part of the tap. This operation is repeated until the tap is filled with threaded nuts, as indicated by dotted lines in Fig. 2. The slide 9 is released by turning the handle 10'. The projection 13' on the rod 13 is disengaged from the head 14' and the slide 9 moved back on the track 8 to make room for drawing out the tap 6 from the end of the shaft 4. (See Fig. 6.) The tap 6 is drawn out and the nuts dropped off of said tap into a suitable receptacle. The tap is then replaced and the carriage 9 moved back and secured to the track 8 and the projection 13' on the rod 13 engaged with the head 14' preparatory to again threading the nuts.

The advantages of our improvements in machines for threading nuts, &c., will be readily appreciated by those skilled in the art. It is of simple construction and operation, and after the tap is filled with threaded nuts the slide with the plunger is quickly moved back out of the way and the tap removed and replaced.

It will be understood that the details of construction of some of the parts of our machine may be varied, if desired, and the machine may be used for other purposes, if desired.

Having thus described our invention, what we claim as new, and desire to secure by Letters Patent, is—

In a machine for threading nuts, &c., the combination with a removable tap, and means for holding and revolving the same, of a slide adapted to be moved longitudinally on a track, and be secured in place thereon, said slide having a reservoir thereon for the blank nuts, and guides for holding the nuts while they are being threaded, and carrying a reciprocating plunger, and said plunger, and a rod detachably connected therewith, said rod connected with treadle mechanism, and said treadle mechanism for operating the plunger, to communicate a positive forward motion thereto, and a spring for returning or moving back the plunger, substantially as shown and described.

GEORGE H. WEBB.
JAMES CLARE.

Witnesses:
  G. W. NEWELL,
  CHAS. H. NEWELL.